Patented Nov. 16, 1948

2,454,255

UNITED STATES PATENT OFFICE 2,454,255

POLYSTYRENE-CHLORINATED META DIPHENYL BENZENE COMPOSITION

Joseph R. Mares, Webster Groves, Mo., assignor to Monsanto Chemical Company, St. Louis, Mo., a corporation of Delaware No Drawing. Application December 6, 1944, Serial No. 566,947

1 Claim. (Cl. 260—45.5)

This invention is directed to new compositions of matter comprising vinyl aromatic polymers and copolymers mixed with chlorinated diphenyl benzenes. More particularly the invention relates to mixtures of styrene polymers or copolymers with chlorinated diphenyl benzenes.

Vinyl aromatic polymers and copolymers are valuable materials for use in the field of electrical insulation and other fields where a dimensionally stable material is advantageous. For many of such applications, the known vinyl aromatic polymers and copolymers have the disadvantage that they tend to soften at moderately elevated temperatures which frequently causes distortion of articles prepared from such polymers.

It is an object of this invention to provide improved compositions comprising vinyl aromatic polymers and copolymers. A further object is to increase the heat distortion temperature and lessen the plastic flow of compositions comprising vinyl aromatic polymers or copolymers without substantially altering their electrical properties. Another object is to provide an improved polystyrene composition. A still further object is to increase the heat distortion temperature and lessen the plastic flow of compositions comprising polystyrene.

These and other objects are attained by incorporating chlorinated diphenyl benzenes in compositions comprising polystyrene resin or other vinyl aromatic polymers and copolymers.

The following examples are intended to be illustrative and not limitative of the scope of the invention. Where parts are mentioned they are parts by weight.

Example I

A composition containing 100 parts polystyrene resin and 100 parts chlorinated meta diphenyl benzene (68% chlorine) is prepared by mixing the two materials together in suitable equipment such as, for example, a pair of milling rolls operating at equal speeds, at a roll temperature of about 325° F. The homogeneous mixture was found to possess good molding characteristics. Molded articles were readily prepared by both injection and compression molding processes.

A bar was compression molded to ½" x ½" x 5" and tested for heat distortion by A. S. T. M. method D48-39. The heat distortion temperature was found to be 88° C.

A compression molded disc 4" in diameter and ¼" thick was tested for electrical properties. It had a dielectric constant of 2.71 and a power factor of .00026 at 1 megacycle.

The non-inflammability of the product of this example is indicated by the fact that a molded strip of this material 5 inches long, 0.5 inch wide and 0.25 inch in thickness did not burn after removal from a gas flame to which it had been exposed for substantially 10 seconds.

The plastic flow of a molded bar of this composition, 5 inches long with a ½ inch square cross section, was found to be less than 1/20 of that of a bar of polystyrene resin identical in size. The measurements were made at 167° F. under a 2.5 kilogram load applied to the center of the bar which was supported at both ends.

The remarkable electrical properties described above, the relatively high heat distortion temperature and low plastic flow, combined with the non-inflammability of the composition of the example make the composition a valuable and improved material for use in the electrical insulating field.

Example II

| | Parts |
|---|---|
| Polystyrene resin | 100 |
| Chlorinated meta diphenyl benzene (68% chlorine) | 100 |
| Powdered quartz | 100 |
| Butyl stearate | 3 |

The above ingredients were mixed together in the same manner as were the components in Example I, the order of adding the materials to the rolls being successively, polystyrene, butyl stearate, chlorinated meta diphenyl benzene, and quartz. The addition of the butyl stearate was for the purpose of enchancing the molding qualities of the product.

This product possessed properties similar to those of the composition of Example I except that the heat distortion temperature was even higher and the plastic flow was substantially decreased.

The chlorinated diphenyl benzenes of this invention may be either the ortho, meta or para isomers or a mixture of two or more of the isomers. The chlorine content may vary from 50 to 69.7% according to the properties desired in the product. The effect of increasing the chlorine content is to raise the melting point and lower the inflammability of the terphenyl compound or mixture. The meta diphenyl benzene described in the examples contained 68% chlorine or an average of approximately 13.5 atoms of chlorine per molecule of meta diphenyl benzene.

In place of the polystyrene resin of the examples, other vinyl aromatic compounds may be used such as halostyrenes, dihalostyrenes, alkyl styrenes, vinyl diphenyl, vinyl naphthalene, divinyl benzene and so forth. Copolymers of the above mentioned compounds with each other or with other polymerizable compounds such as maleic anhydride, fumaronitrile, vinyl chloride, and acrylic monomers such as methyl acrylate or methyl methacrylate may also be used to obtain the improved products of this invention.

Other materials may be added to the compositions of this invention as desired, for example, fillers, such as the quartz of Example II and including other minerals as well as fibrous fillers, lubricants such as the butyl stearate of Example II, coloring materials or other modifying agents.

Generally the amount of chlorinated diphenyl benzene that is incorporated in the vinyl aromatic polymer or copolymer varies from 30 to 150 parts per 100 parts of polymer or copolymer although there may be some sacrifice of strength and molding qualities of the product when the higher proportions of the chlorinated diphenyl benzene are employed. Substantially equal parts of a chlorinated diphenyl benzene and vinyl aromatic polymer or copolymer produce a composition that is superior for many purposes.

The compositions of this invention are particularly valuable for electrical fixtures and other insulation purposes, especially in radio work where high frequency currents are employed. They may also be used to advantage in other fields where non-inflammability and high heat distortion temperatures are important as is obvious to those skilled in the art.

The compositions of this invention may be formed into a desired shape by any of the customary methods employed for plastic materials. Thus, in addition to shaping these compositions by injection, transfer or compression molding methods, they may be continuously extruded into sheets, rods or tubes of either regular or irregular cross sectional shape. Other shaping methods that may be employed comprise forming into sheets by well known calendering methods or by sheeting preformed cakes in the customary manner.

It will be obvious that other suitable changes and variations may be adopted without departing from the spirit and scope of the invention as defined in the claim.

What is claimed is:

A composition of matter consisting of 100 parts of polystyrene resin and 100 parts of chlorinated meta diphenyl benzene containing 68% chlorine, said composition being characterized by a heat distortion temperature above that of polystyrene.

JOSEPH R. MARES.

REFERENCES CITED

The following references are of record in the file of this patent:

UNITED STATES PATENTS

| Number | Name | Date |
|---|---|---|
| 2,158,281 | Ford | May 16, 1939 |
| 2,198,977 | Rost | Apr. 30, 1940 |
| 2,333,513 | Berberich | Nov. 2, 1943 |
| 2,341,761 | Clark | Feb. 15, 1944 |

OTHER REFERENCES

Simonds et al., Handbook of Plastics, Van Nostrand, 1943, page 42.